(12) United States Patent
Asper

(10) Patent No.: US 9,919,568 B2
(45) Date of Patent: Mar. 20, 2018

(54) TIRE WITH TOROIDAL ELEMENT

(71) Applicant: Bridgestone Americas Tire Operations, LLC, Nashville, TN (US)

(72) Inventor: Robert Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 316 days.

(21) Appl. No.: 14/487,391

(22) Filed: Sep. 16, 2014

(65) Prior Publication Data
US 2015/0083296 A1    Mar. 26, 2015

Related U.S. Application Data

(60) Provisional application No. 61/881,474, filed on Sep. 24, 2013.

(51) Int. Cl.
| | |
|---|---|
| *B60C 9/02* | (2006.01) |
| *B60C 15/00* | (2006.01) |
| *B60C 15/06* | (2006.01) |
| *B60C 17/00* | (2006.01) |
| *B60C 9/18* | (2006.01) |

(52) U.S. Cl.
CPC ...... *B60C 15/0045* (2013.01); *B60C 17/0009* (2013.01); *B60C 17/0018* (2013.01); *B60C 15/06* (2013.01); *B60C 2009/1878* (2013.01); *B60C 2017/0063* (2013.01); *B60C 2017/0072* (2013.01); *B60C 2017/0081* (2013.01)

(58) Field of Classification Search
CPC .. B60C 9/00; B60C 9/02; B60C 15/00; B60C 15/0036; B60C 15/06
See application file for complete search history.

(56) References Cited

U.S. PATENT DOCUMENTS

| | | |
|---|---|---|
| 3,052,275 A | 9/1962 | Hylbed, Jr. |
| 4,263,955 A | 4/1981 | Ikeda |
| 4,649,979 A | 3/1987 | Kazusa et al. |
| 4,934,425 A | 6/1990 | Gajewski et al. |
| 4,944,563 A | 7/1990 | Pinchbeck et al. |
| 4,945,962 A | 8/1990 | Pajtas |

(Continued)

FOREIGN PATENT DOCUMENTS

| | | |
|---|---|---|
| CN | 1689847 | 11/2015 |
| DE | 1262580 | 3/1968 |

(Continued)

OTHER PUBLICATIONS

Written Opinion and International Search Report; corresponding PCT Application No. PCT/US2014/055757; Authorized Officer Lee, Hun Gil; dated Dec. 22, 2014.

(Continued)

*Primary Examiner* — Justin R Fischer
(74) *Attorney, Agent, or Firm* — Shaun J. Fox; Bryan Jaketic

(57) ABSTRACT

A tire includes a tread formed in a crown region of the tire and sidewall regions extending from the crown region to bead areas. The tire further includes a toroidal element extending across a crown region of the tire, and further extending along at least a portion of each sidewall region of the tire. The toroidal element has a central region located between inner and outer regions. The central region is more elastic than the inner and outer regions.

20 Claims, 5 Drawing Sheets

(56) References Cited

U.S. PATENT DOCUMENTS

| | | |
|---|---|---|
| 5,042,544 A | 8/1991 | Dehasse |
| 5,050,656 A | 9/1991 | Ho |
| 5,086,815 A | 2/1992 | Panaroni et al. |
| 5,090,464 A | 2/1992 | Kauzlarich et al. |
| 5,139,066 A | 8/1992 | Jarman |
| 5,168,910 A | 12/1992 | Zhang et al. |
| 5,174,634 A | 12/1992 | Blanck et al. |
| 5,223,599 A | 6/1993 | Gajewski |
| 5,225,010 A | 7/1993 | Shisheng |
| 5,236,027 A | 8/1993 | Lu |
| 5,265,659 A | 11/1993 | Pajtas et al. |
| 5,343,916 A | 9/1994 | Duddey et al. |
| 5,353,853 A | 10/1994 | Hansson |
| 5,390,985 A | 2/1995 | Chandler |
| RE34,909 E | 4/1995 | Kindel et al. |
| 5,435,367 A | 7/1995 | Price |
| 5,460,213 A | 10/1995 | Pajtas |
| 5,494,090 A | 2/1996 | Kejha |
| 5,743,316 A | 4/1998 | Chrobak |
| 5,879,484 A | 3/1999 | Spragg et al. |
| 6,032,710 A | 3/2000 | Milman |
| 6,053,229 A * | 4/2000 | Suzuki .................. B29D 30/32 152/541 |
| 6,170,544 B1 | 1/2001 | Hottebart |
| 6,213,561 B1 | 4/2001 | Witthaus |
| 6,250,355 B1 | 6/2001 | Provitola |
| 6,279,630 B1 | 8/2001 | Herbert Ims |
| 6,298,891 B1 | 10/2001 | Harris |
| 6,374,887 B1 | 4/2002 | Subotics |
| 6,431,235 B1 | 8/2002 | Steinke |
| 6,450,222 B1 | 9/2002 | Fleming |
| 6,640,859 B1 | 11/2003 | Laurent et al. |
| 6,681,822 B2 | 1/2004 | Adams et al. |
| 6,698,480 B1 | 3/2004 | Cornellier |
| 6,971,426 B1 | 12/2005 | Steinke |
| 6,994,134 B2 | 2/2006 | Grah |
| 6,994,135 B2 | 2/2006 | Delfino et al. |
| 7,013,939 B2 | 3/2006 | Rhyne et al. |
| 7,032,634 B2 | 4/2006 | Laurent et al. |
| 7,032,637 B2 | 4/2006 | Meraldi |
| 7,044,180 B2 | 5/2006 | Rhyne et al. |
| 7,066,225 B2 | 6/2006 | Rhyne et al. |
| 7,143,797 B2 | 12/2006 | Vannan |
| 7,159,632 B2 | 1/2007 | Fukui |
| 7,174,936 B2 | 2/2007 | Becker et al. |
| 7,201,194 B2 | 4/2007 | Rhyne et al. |
| 7,231,948 B2 | 6/2007 | Forney, III et al. |
| 7,316,252 B1 | 1/2008 | Heard |
| 7,418,988 B2 | 9/2008 | Cron et al. |
| 7,523,773 B2 | 4/2009 | Gabrys et al. |
| 7,546,862 B2 | 6/2009 | Moon et al. |
| 7,650,919 B2 | 1/2010 | Rhyne et al. |
| 7,743,806 B2 | 6/2010 | Abe |
| 7,950,428 B2 | 5/2011 | Hanada et al. |
| 7,980,282 B2 | 7/2011 | Moyna et al. |
| 8,056,593 B2 | 11/2011 | Palinkas et al. |
| 8,061,398 B2 | 11/2011 | Palinkas et al. |
| 8,091,596 B2 | 1/2012 | Louden |
| 8,104,524 B2 | 1/2012 | Manesh et al. |
| 8,109,308 B2 | 2/2012 | Manesh et al. |
| 8,113,253 B2 | 2/2012 | Arakawa et al. |
| 8,141,606 B2 | 3/2012 | Benzing, II et al. |
| 8,176,957 B2 | 5/2012 | Manesh et al. |
| 8,215,351 B2 | 7/2012 | Thompson |
| 8,276,628 B2 | 10/2012 | Hanada et al. |
| 8,333,437 B2 | 12/2012 | Matsuda et al. |
| 2002/0033220 A1 | 3/2002 | Steinke |
| 2002/0043319 A1 | 4/2002 | Meraldi |
| 2002/0096237 A1 | 7/2002 | Burhoe et al. |
| 2003/0024622 A1 | 2/2003 | Chrobak |
| 2003/0201043 A1 | 10/2003 | Adams et al. |
| 2003/0205306 A1 | 11/2003 | Steinke |
| 2003/0213541 A1 | 11/2003 | Laurent et al. |
| 2003/0226630 A1 | 12/2003 | Delfino et al. |
| 2004/0140032 A1 | 7/2004 | Rhyne et al. |
| 2004/0144464 A1 | 7/2004 | Rhyne et al. |
| 2004/0159385 A1 | 8/2004 | Rhyne et al. |
| 2004/0187996 A1 | 9/2004 | Grah |
| 2005/0045261 A1 | 3/2005 | Yuze et al. |
| 2005/0072507 A1 | 4/2005 | Chrobak et al. |
| 2005/0133133 A1 | 6/2005 | Becker et al. |
| 2005/0205181 A1 | 9/2005 | Forney, III et al. |
| 2005/0263229 A1 | 12/2005 | Steinke |
| 2005/0269005 A1 | 12/2005 | Steinke |
| 2006/0005903 A1 | 1/2006 | Fry et al. |
| 2006/0060280 A1 | 3/2006 | Ladouce et al. |
| 2006/0096685 A1 | 5/2006 | Fukui |
| 2006/0113016 A1 | 6/2006 | Cron et al. |
| 2006/0144488 A1 | 7/2006 | Vannan |
| 2006/0169797 A1 | 8/2006 | Kaltenheuser |
| 2006/0174989 A1 | 8/2006 | Jones |
| 2006/0249236 A1 | 11/2006 | Moon et al. |
| 2006/0260729 A1 | 11/2006 | Cogne et al. |
| 2007/0006951 A1 | 1/2007 | Summers |
| 2007/0029020 A1 | 2/2007 | Wietharn et al. |
| 2007/0089820 A1 | 4/2007 | Gabrys et al. |
| 2007/0119531 A1 | 5/2007 | Steinke et al. |
| 2007/0215259 A1 | 9/2007 | Burns |
| 2007/0251627 A1 | 11/2007 | Wright |
| 2007/0267116 A1 | 11/2007 | Rhyne et al. |
| 2008/0053586 A1 | 3/2008 | Hanada et al. |
| 2008/0073014 A1 | 3/2008 | Abe |
| 2008/0105350 A1 | 5/2008 | Steinke |
| 2008/0116737 A1 | 5/2008 | St. George |
| 2008/0314486 A1 | 12/2008 | Manesh et al. |
| 2009/0095389 A1 | 4/2009 | Moyna et al. |
| 2009/0107596 A1 | 4/2009 | Palinkas et al. |
| 2009/0120548 A1 | 5/2009 | Norbits |
| 2009/0183810 A1 | 7/2009 | Vannan et al. |
| 2009/0211674 A1 | 8/2009 | Hanada et al. |
| 2009/0211675 A1 | 8/2009 | Louden |
| 2009/0211677 A1 | 8/2009 | Palinkas et al. |
| 2009/0211678 A1 | 8/2009 | Palinkas et al. |
| 2009/0211681 A1 | 8/2009 | Palinkas et al. |
| 2009/0250149 A1 | 10/2009 | Sebe |
| 2009/0283185 A1 | 11/2009 | Manesh et al. |
| 2009/0294000 A1 | 12/2009 | Cron |
| 2009/0301625 A1 | 12/2009 | Moon et al. |
| 2010/0018621 A1 | 1/2010 | Thompsom |
| 2010/0024960 A1 | 2/2010 | Jin et al. |
| 2010/0071819 A1 | 3/2010 | McCulley |
| 2010/0078111 A1 | 4/2010 | Anderson et al. |
| 2010/0108215 A1 | 5/2010 | Palinkas et al. |
| 2010/0132858 A1 | 6/2010 | Arakawa et al. |
| 2010/0132865 A1 | 6/2010 | Iwase et al. |
| 2010/0141019 A1 | 6/2010 | Honiball et al. |
| 2010/0154948 A1 | 6/2010 | Dahlberg et al. |
| 2010/0193097 A1 | 8/2010 | McNier et al. |
| 2010/0200131 A1 | 8/2010 | Iwase et al. |
| 2010/0218869 A1 | 9/2010 | Abe |
| 2010/0300587 A1 | 12/2010 | Benzing, II et al. |
| 2010/0307653 A1 | 12/2010 | Delfino et al. |
| 2010/0314014 A1 | 12/2010 | Burns |
| 2011/0000596 A1 | 1/2011 | Sachdev et al. |
| 2011/0011506 A1 | 1/2011 | Manesh et al. |
| 2011/0024008 A1 | 2/2011 | Manesh et al. |
| 2011/0030861 A1 | 2/2011 | Wichern |
| 2011/0030866 A1 | 2/2011 | Fadel et al. |
| 2011/0079335 A1 | 4/2011 | Manesh et al. |
| 2011/0079336 A1 | 4/2011 | Thenault et al. |
| 2011/0108173 A1 | 5/2011 | Abe |
| 2011/0146872 A1 | 6/2011 | Tercha et al. |
| 2011/0168313 A1 | 7/2011 | Ma et al. |
| 2011/0180194 A1 | 7/2011 | Anderson et al. |
| 2011/0240189 A1 | 10/2011 | Dutton |
| 2011/0240190 A1 | 10/2011 | Summers et al. |
| 2011/0240193 A1 | 10/2011 | Matsuda et al. |
| 2011/0240194 A1 | 10/2011 | Summers et al. |
| 2011/0248554 A1 | 10/2011 | Chon et al. |
| 2011/0277893 A1 | 11/2011 | Benzing, II |
| 2011/0290394 A1 | 12/2011 | Luchini et al. |
| 2012/0031535 A1 | 2/2012 | Thompson |
| 2012/0031536 A1 | 2/2012 | Re Fiorentin et al. |
| 2012/0038206 A1 | 2/2012 | Chadwick et al. |

(56) References Cited

U.S. PATENT DOCUMENTS

| | | |
|---|---|---|
| 2012/0038207 A1 | 2/2012 | Williams et al. |
| 2012/0048440 A1 | 3/2012 | Lettieri et al. |
| 2012/0060991 A1 | 3/2012 | Mun et al. |
| 2012/0067481 A1 | 3/2012 | Cron |
| 2012/0193004 A1 | 8/2012 | Anderson et al. |
| 2012/0193005 A1 | 8/2012 | McCulley |
| 2012/0205017 A1 | 8/2012 | Endicott |
| 2012/0216932 A1 | 8/2012 | Cron et al. |
| 2012/0223497 A1 | 9/2012 | Radziszewski et al. |
| 2012/0234444 A1 | 9/2012 | Palinkas et al. |
| 2012/0234445 A1 | 9/2012 | Manesh et al. |
| 2012/0241062 A1 | 9/2012 | Manesh et al. |
| 2012/0241531 A1 | 9/2012 | Werner |
| 2012/0247635 A1 | 10/2012 | Manesh et al. |
| 2012/0318417 A1 | 12/2012 | Dotson et al. |
| 2012/0318418 A1 | 12/2012 | Benzing, II et al. |
| 2012/0318421 A1 | 12/2012 | Matsuda et al. |
| 2013/0014874 A1 | 1/2013 | Moon |
| 2013/0048171 A1* | 2/2013 | Sandstrom .......... B60C 11/1346 152/209.18 |
| 2013/0048174 A1 | 2/2013 | Cron |

FOREIGN PATENT DOCUMENTS

| | | | |
|---|---|---|---|
| EP | 0635383 | | 1/1995 |
| EP | 1400374 | * | 3/2004 |
| EP | 1580038 | * | 9/2005 |
| GB | 883645 | * | 12/1961 |
| JP | S61012405 | | 1/1986 |
| JP | S63110003 | | 5/1988 |
| JP | H07215008 | | 8/1995 |
| JP | 2000198315 | | 7/2000 |
| JP | 2001010305 | | 1/2001 |
| JP | 2004276715 | | 3/2003 |
| WO | 2012161331 | | 11/2012 |

OTHER PUBLICATIONS

First Office Action; corresponding CN Application No. 2014800525332; dated Nov. 30, 2016.

English Translation: First Office Action; corresponding CN Application No. 2014800525332; dated Nov. 30, 2016.

Search Report; corresponding Russian Application No. 2016112356/11(019485); dated Feb. 20, 2017.

Search Opinion; corresponding European Application No. 14847385.3; dated May 23, 2017.

Supplemental Search Report; corresponding European Application No. 14847385.3; dated May 23, 2017.

* cited by examiner

TIRE WITH TOROIDAL ELEMENT

CROSS-REFERENCE TO RELATED APPLICATIONS

This application claims priority from U.S. Provisional Patent Application No. 61/881,474, filed on Sep. 24, 2013, the disclosure of which is incorporated by reference herein in its entirety.

FIELD OF INVENTION

The present disclosure relates to a tire having a toroidal element. More particularly, the present disclosure relates to a tire having a toroidal element extending across a crown region of the tire and along at least a portion of each sidewall region of the tire.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. One such type of run flat tire incorporates a thin annular high strength band element which acts as a tension member when the tire is pressurized and acts as a structural compression member when the tire is in the unpressurized or partially pressurized state.

SUMMARY

In one embodiment, a tire includes a crown region, a pair of sidewall regions, and a pair of beads, including a first bead and a second bead. The tire further includes a body ply having a main portion which extends circumferentially about the tire from the first bead to the second bead, a first turned-up portion around the first bead, and a second turned-up portion around the second bead. The first turned-up portion has a first end in the crown region of the tire. The second turned-up portion has a second end in the crown region of the tire. The first turned-up portion overlaps the second turned-up portion. The tire also includes a toroidal element located between the main portion of the body ply and the first and second turned-up portions of the body ply. The toroidal element includes inner and outer regions formed by the body ply, and a central region formed by an inner rubber component located between the main portion of the body ply and the turned-up portions of the body ply. At least a portion of the central region is more elastic than the inner and outer regions. The toroidal element extends across the crown region of the tire. The toroidal element extends along at least a portion of at least one sidewall region of the tire.

In another embodiment, a tire includes a tread formed in a crown region of the tire and sidewall regions extending from the crown region to bead areas. The tire further includes a toroidal element extending across a crown region of the tire, and further extending along at least a portion of each sidewall region of the tire. The toroidal element has a central region located between inner and outer regions. The central region is more elastic than the inner and outer regions.

In yet another embodiment, a non-pneumatic tire includes a pair of bead regions, a tread formed in a crown region of the tire, and sidewall regions extending from the crown region to the bead regions. The tire also includes a toroidal element extending across a crown region of the tire, and further extending along at least a portion of each sidewall region of the tire. The toroidal element has a pair of inextensible plies with rubber disposed between the inextensible plies.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Bead" refers to the part of the tire that contacts the wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
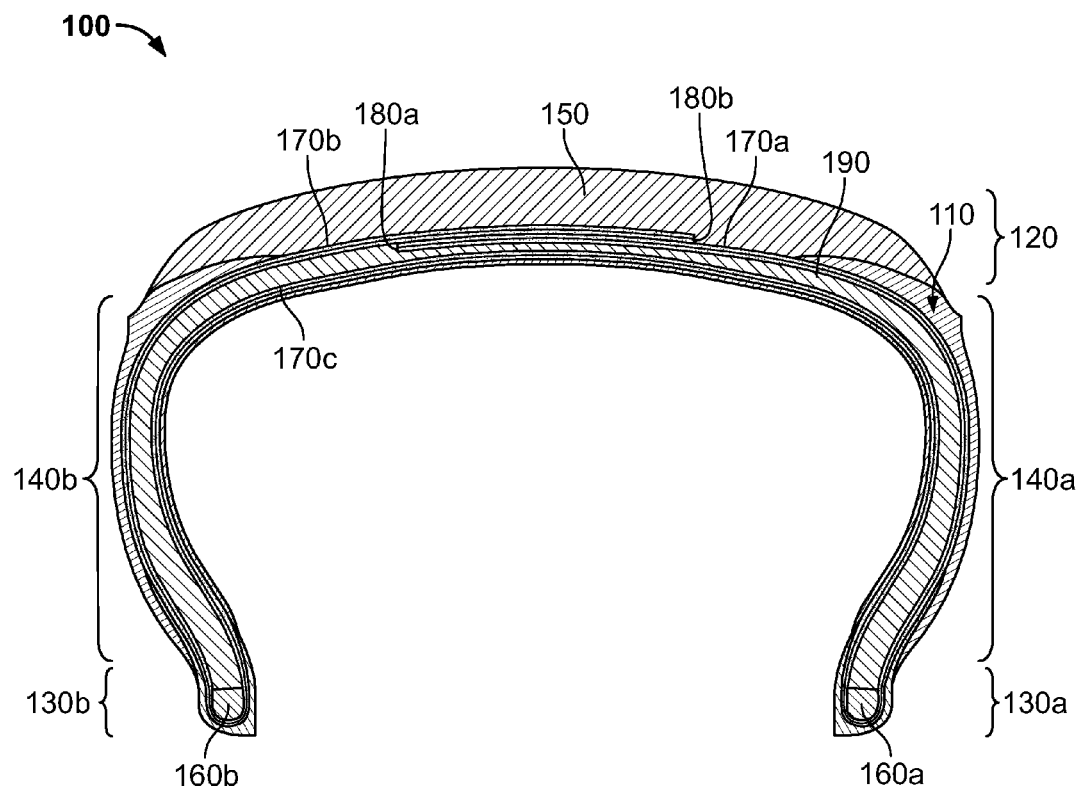
FIG. 1 is a cross-section of a tire 100 having one embodiment of a toroidal element incorporated therein.

FIG. 1 is a cross-section of a tire 100 having a toroidal element 110 incorporated therein. Tire 100 includes a crown region 120, a pair of bead regions 130, including a first bead region 130a and a second bead region 130b, and a pair of sidewall regions 140a,b extending from the crown region 120 to the bead regions 130. A tread 150 is formed in the crown region 120 of the tire. Each bead region 130 includes a bead 160 and may optionally include a bead filler (not shown), a gum abrasion strip (not shown), and other components therein.

Tire 100 further includes a pair of body plies 170 having first turned-up portions 170a, second turned up portions 170b, and main portions 170c. The main portions 170c extend circumferentially about the tire from a first bead 160a to a second bead 160b. The first turned-up portions 170a extend around the first bead 160a and terminate at a first end 180a in the crown region 120 of the tire 100. The second turned-up portions 170b extend around the second bead 160b and terminate at a second end 180b in the crown region 120 of the tire 100, such that the first turned-up portions 170a overlaps the second turned-up portions 170b. In an alternative embodiment (not shown), the first turned-up portion does not overlap the second turned-up portion. Instead, additional plies span the crown region overlapping both turn-up ends. While a pair of body plies 170 are shown in FIG. 1, it should be understood that this is for illustrative purposes. In a commercialized embodiment, the tire may include a single body ply, or three or more body plies.

Construction of body plies is known in the art. The body plies may include rubber and reinforcement cords constructed of fabric such as cotton, rayon, nylon, polyester, aramid fibers, or metal. The body plies may be described as inextensible.

In the illustrated embodiment, the toroidal element 110 includes the body ply cords 170 as well as an inner rubber component 190. The rubber component 190 is sandwiched between the main portions 170c of the body plies and the turned up portions 170a,b. The toroidal element 110 therefore stretches from bead to bead, and include the beads 160a,b. The resulting structure is shaped like a traditional pneumatic tire, but is sufficiently stiff enough to carry loads typical of a similarly sized pneumatic tire without requiring internal air pressure for preload. The design does not preclude or require the use of internal air pressure.

In an alternative embodiment (not shown), the toroidal element is a partial toroidal element that extends into one sidewall of the tire, but not both sidewalls.

The toroidal element 110 is configured to increase interlaminar shear strength across the axial length of the tire 100 as well as in the sidewall regions 140 of the tire. This allows for the tire 100 to flex in the manner shown in FIG. 2 when the tire is under a load, and may improve durability of the tire.

As one of ordinary skill in the art would understand, the tire 100 may also include a belt (not shown) in the crown region 120. In one embodiment, the toroidal element 110 has a consistent thickness throughout. In an alternative embodiment, the toroidal element has a first thickness in the crown region and a second thickness greater than the first thickness in a region outside the belt. In another alternative embodiment, the toroidal element has a first thickness in the crown region and a second thickness less than the first thickness in a region outside the belt.

Figure 3:
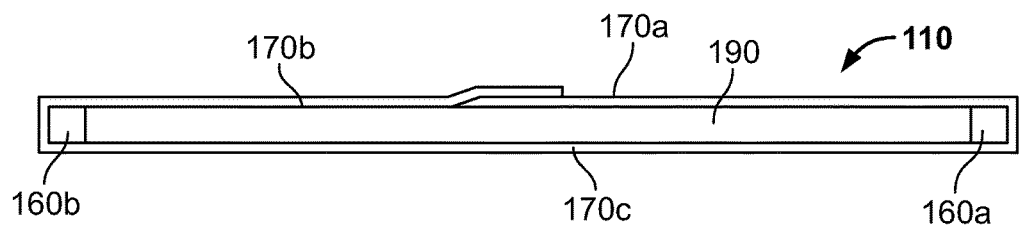
FIG. 3 is a schematic drawing of one embodiment of a toroidal element shown in a straight condition for illustrative purposes.

FIG. 3 is a schematic drawing of one embodiment of a toroidal element 110 shown in a straight condition for illustrative purposes. As discussed above, the rubber component 190 is sandwiched between the main portions 170c of the body plies and the turned up portions 170a,b. The toroidal 110 therefore stretches from bead to bead, and include the beads 160a,b. In building a tire, the rubber component 190 may initially be straight, as shown, and then bent to a toroidal shape. Alternatively, the rubber component 190 may be pre-formed in a toroidal shape.

Figure 2:
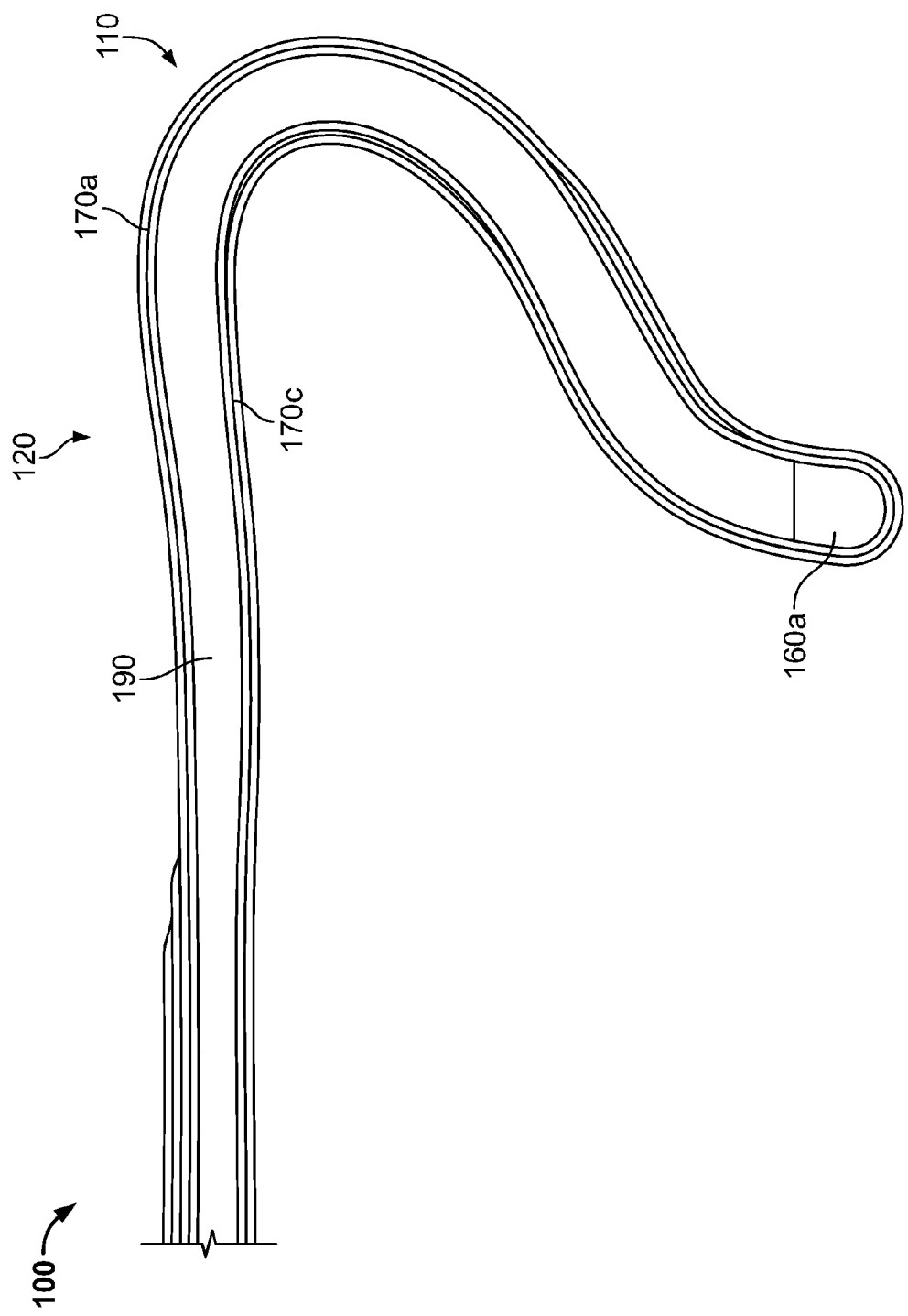
FIG. 2 is a cross-section of the tire 100 under a load.
Figure 4:
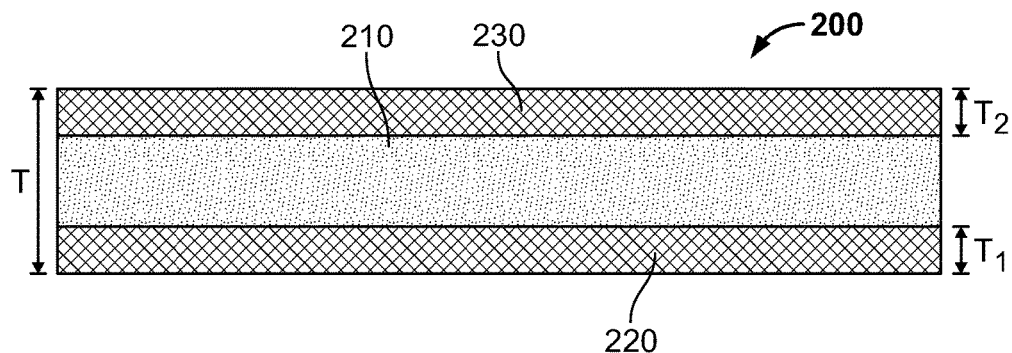
FIG. 4 is a schematic drawing of a of a partial cross-section of an alternative embodiment of a toroidal element.

FIG. 4 is a schematic drawing of a partial cross-section of an exemplary toroidal element 200 that may be used as the toroidal element 110 in the tire 100 in FIGS. 1 and 2. The toroidal element 200 has three distinct regions. As discussed above, in the embodiment of FIGS. 1 and 2, the central or interior region 210 is of the internal rubber component 190, and the inner region 220 and outer region 230 are formed by the main portions 170c and the turned-up portions 170a,b of the body plies 170. As one of ordinary skill in the art would understand, with such a construction, the central region has high interlaminar shear strength, and the inner region 220 and outer region 230 have a high flexural modulus in the circumferential direction. In other words, the central region 210 is more elastic than the inner and outer regions 220,230.

In the illustrated embodiment, the overall thickness of the toroidal element 200 is indicated by reference character T while the thickness of the inner region is indicated by reference character $T_1$ and the thickness of the outer region is indicated by reference character $T_2$. The radial thickness of the outer, central, and inner regions can be in various combinations. In one known embodiment, the thicknesses of the regions will be within the general range of $T/3 > T_1 > T/10$ and $T/3 > T_2 > T/10$. In one particular embodiment, the thicknesses of the regions will be within the range of $T/4 > T_1 > T/8$ and $T/4 > T_2 > T/8$. In one known embodiment, the thickness of the inner region $T_1$ is equal to the thickness of the outer region $T_2$.

In one embodiment, the flexural modulus of the inner and outer regions is determined for example by ASTM D790-97, and is within the range of $3.4 \times 10^{10}$ Pa $< E_{circumferential} < 2.1 \times 10^{11}$ Pa. In one particular embodiment, the flexural modulus of the inner and outer regions is within with the range $4.1 \times 10^{10}$ Pa $< E_{circumferential} < 1.4 \times 10^{11}$ Pa.

As would be understood by those skilled in the art, the toroidal element may also be constructed of other materials, such that the element has a central region with high interlaminar shear strength, and the inner and outer regions with a high flexural modulus in the circumferential direction. In one alternative embodiment, the central region of the toroidal element is formed of a layer of rubber and the inner and outer regions are formed of a resin. In an alternative embodiment, the central region is formed of a layer of rubber, and the body plies of the tire form the inner and outer regions of the toroidal element. In both embodiments, the rubber layer may bond the inner and outer regions together so that the three regions function as one monolithic composite. The rubber will have sufficient strength to hold the three regions together so that in bending the cross sectional moment of inertia is based upon the aggregate of the three regions. The rubber central region may also include a plurality of randomly oriented fibers.

In one alternative embodiment, the central region is constructed of a rubber compound having a high modulus and a low tan δ. In one known embodiment, a sulfur vulcanizable rubber compound, following vulcanization, has a mechanical static modulus in the range of $9.7 \times 10^6$ Pa to $2.8 \times 10^7$ Pa at 15% strain, a loss modulus or tan δ in the range of 0.03 to 0.20 measured at 100° C., 7% deflection and 10 Hz, and has a Shore A hardness in the range of 70 to 97.

It should be understood that various resin adhesives or combination thereof can be utilized to construct the toroidal element. Polyphenylsulfide ("PPS") and Polytherimide ("PEI") are representative examples of resins commercially available and suitable for the thermoplastic composites. Thermosetting composites, epoxy adhesives and toughened epoxy adhesives also are readily available materials well known in the art and available from many sources. For example, a toughened epoxy adhesive is identified as F351 from Nippon Zeon (U.S. Pat. No. 5,290,857, incorporated herein by reference in its entirety).

In any of the above described embodiments, construction of the three regions can be accomplished by known fabrication techniques, including without limitation homogenous filament winding, non-homogeneous filament winding, multilayer tape composite winding, winding with prepreg materials, winding with wet woven materials, winding with mats, winding with resin transfer molding processes, winding with wet or prepreg woven preforms, and any combination of some or all of the above. The particular materials and fiber orientations and arrangements may be selected to achieve optimum performance of the toroidal element.

Although the drawings and following description show and describe three distinct layers, it should be understood that the three regions of the toroidal element have certain properties which can be achieved in a single homogenous material, or a combination of more than three layers.

Figure 5:
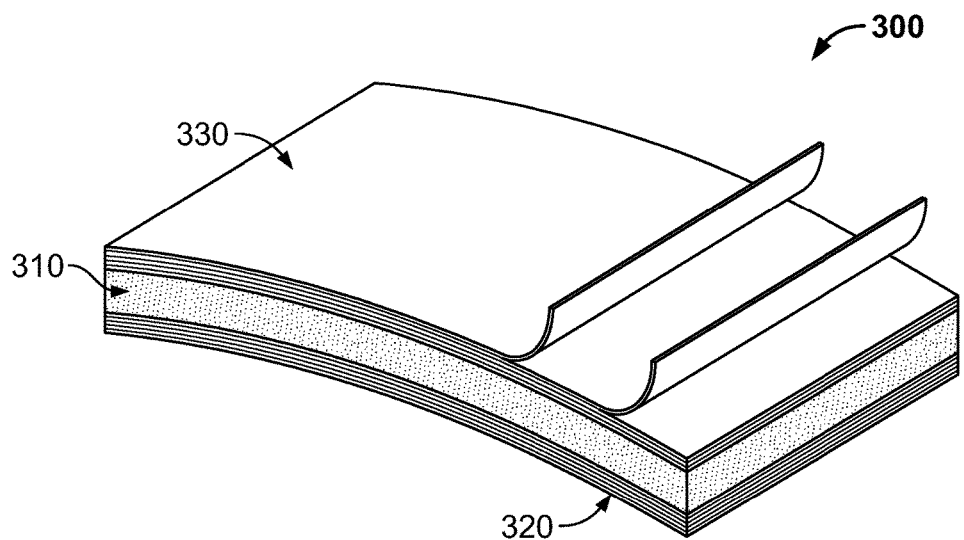
FIG. 5 is a partial perspective view of one specific alternative embodiment of a toroidal element.

FIG. 5 is a partial perspective view of one specific alternative embodiment of a toroidal element 300. In this embodiment, the interior or central region indicated generally at 310, is formed as a single layer of a suitable resin free of any reinforcing fibers. The resin can be PPS, PEI, epoxy adhesive, a toughened epoxy adhesive or the like as discussed above. Inner layer 320 and outer layer 330 can be formed of various materials such as various types of thermoplastic tapes or layers of thermosetting resins, and can be formed by known fabrication processes. In one embodiment, inner and outer regions 320 and 330 will be of the same material and of the same thickness, and will have a higher modulus than that of central region 310.

In an alternative embodiment (not shown), the central region of the toroidal element is made of multiple layers of resin-only tape, which are laid up to form central region in a similar manner as described in U.S. Pat. No. 5,879,484, which is incorporated herein by reference in its entirety. In one such embodiment, the inner and outer regions may be reinforced with graphite fibers while the central region may be reinforced with glass fibers.

In another alternative embodiment (not shown), the central region is constructed of resin reinforced by randomly oriented fibers, which fibers extend in the circumferential direction, the radial direction, the lateral direction and combinations thereof. Such a region may be formed by a filament winding process, which produces a thick tow of randomly oriented fibers which is then wound into the central region. However, the other fabrication techniques can also be utilized.

The randomly oriented fibers in central region resist the interlaminar shear slippage of the circumferential planes, because the fibers cross the neutral axis in all directions. Additionally, this random arrangement of fibers provide for increased peel strength of the toroidal element where peel strength is characterized by the ability of the toroidal element to withstand stresses in the radial direction.

In still another alternative embodiment (not shown) the central region of the toroidal element is constructed of fiberglass tow with reinforcement fibers oriented in the circumferential direction within the tow. Alternatively, the reinforcement fibers may be oriented randomly. Additional constructions of known band elements are described in U.S. Pat. No. 6,460,586, which is incorporated herein by reference in its entirety.

Figure 6:
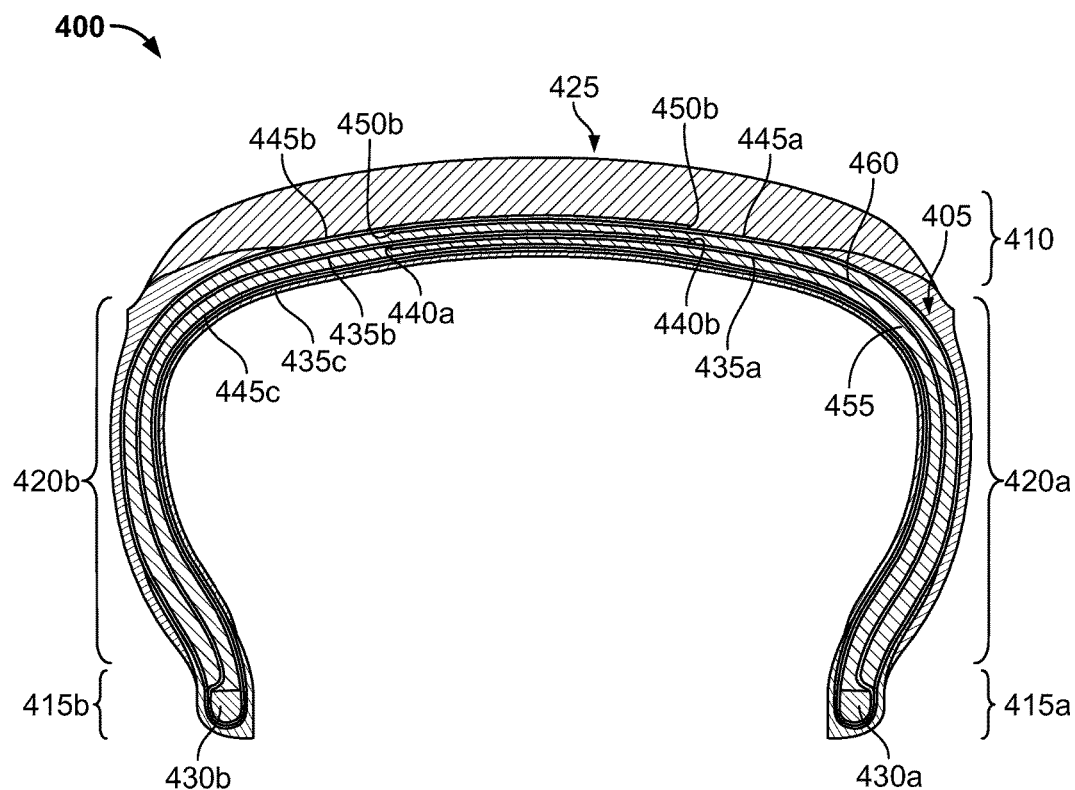
FIG. 6 is a cross-section of a tire having an alternative embodiment of a toroidal element incorporated therein.

FIG. 6 illustrates a cross-section of a tire 400 having an alternative embodiment of a toroidal element 405 incorporated therein. Tire 400 includes a crown region 410, a pair of bead regions 415, including a first bead region 415a and a second bead region 415b, and a pair of sidewall regions 420a,b extending from the crown region 410 to the bead regions 415. A tread 425 is formed in the crown region 410 of the tire. Each bead region 415 includes a bead 430 and may optionally include a bead filler (not shown), a gum abrasion strip (not shown), and other components therein.

Tire 400 further includes a first body ply 435 having a first turned-up portion 435a, a second turned up portion 435b, and a main portion 435c. The main portion 435c extends circumferentially about the tire from a first bead 430a to a second bead 430b. The first turned-up portion 435a extends around the first bead 430a and terminates at a first end 440a in the crown region 410 of the tire 400. The second turned-up portion 435b extends around the second bead 430b and terminates at a second end 440b in the crown region 410 of the tire 400, such that the first turned-up portion 435a overlaps the second turned-up portion 435b.

Tire 400 further includes a second body ply 445 having a first turned-up portion 445a, a second turned up portion 445b, and a main portion 445c. The main portion 445c extends circumferentially about the tire from a first bead 430a to a second bead 430b. The first turned-up portion 445a extends around the first bead 430a and terminates at a first end 450a in the crown region 410 of the tire 400. The second turned-up portion 445b extends around the second bead 430b and terminates at a second end 450b in the crown region 410 of the tire 400, such that the first turned-up portion 445a overlaps the second turned-up portion 445b.

In the illustrated embodiment, the toroidal element 405 includes the body ply cords 435, 445 as well as a first inner rubber component 455 and a second inner rubber component 460. The first rubber component 455 is sandwiched between the main portion 435c, 445c of the first and second body plies 435, 445 and the turned up portions 440a,b of the first body ply 435. The second rubber component 460 is sandwiched between and the turned up portions 440a,b of the first body ply 435 and the turned up portions 450a,b of the second body ply 445. The toroidal element 405 therefore stretches from bead to bead, and include the beads 430a,b.

Figure 7:
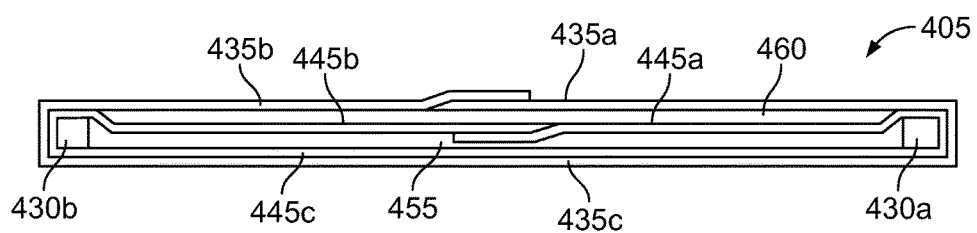
FIG. 7 is a schematic drawing of an alternative embodiment of a toroidal element shown in a straight condition for illustrative purposes.

FIG. 7 is a schematic drawing of one embodiment of the toroidal element 405 of FIG. 6 shown in a straight condition for illustrative purposes. The first rubber component 455 is sandwiched between the main portion 435c, 445c of the first and second body plies 435, 445 and the turned up portions 435a,b of the first body ply 435. The second rubber component 460 is sandwiched between the turned up portions 435a,b of the first body ply 435 and the turned up portions 445a,b of the second body ply 445. The toroidal element 405 therefore stretches from bead to bead, and include the beads 430a,b. In building a tire, the first and second rubber components 455, 460 may initially be straight, as shown, and then bent to a toroidal shape. Alternatively, the first and second rubber components 455, 460 may be pre-formed in a toroidal shape. In an alternative embodiment (not shown), the toroidal element is a partial toroidal element that extends into one sidewall of the tire, but not both sidewalls.

While the illustrated embodiments generally show a rubber components 455, 460 disposed between main portions 435c, 445c of body plies and turned-up portions 435a,b and 445a,c of the body plies, it should be understood that any combination of rubber layers and body ply layers may be employed. The body ply layers may be formed of multiple body plies that form multiple main portions and multiple turned-up portions, or multiple main portions and multiple turned-down portions. The body ply layers may also be formed of separate body plies.

Figure 8:
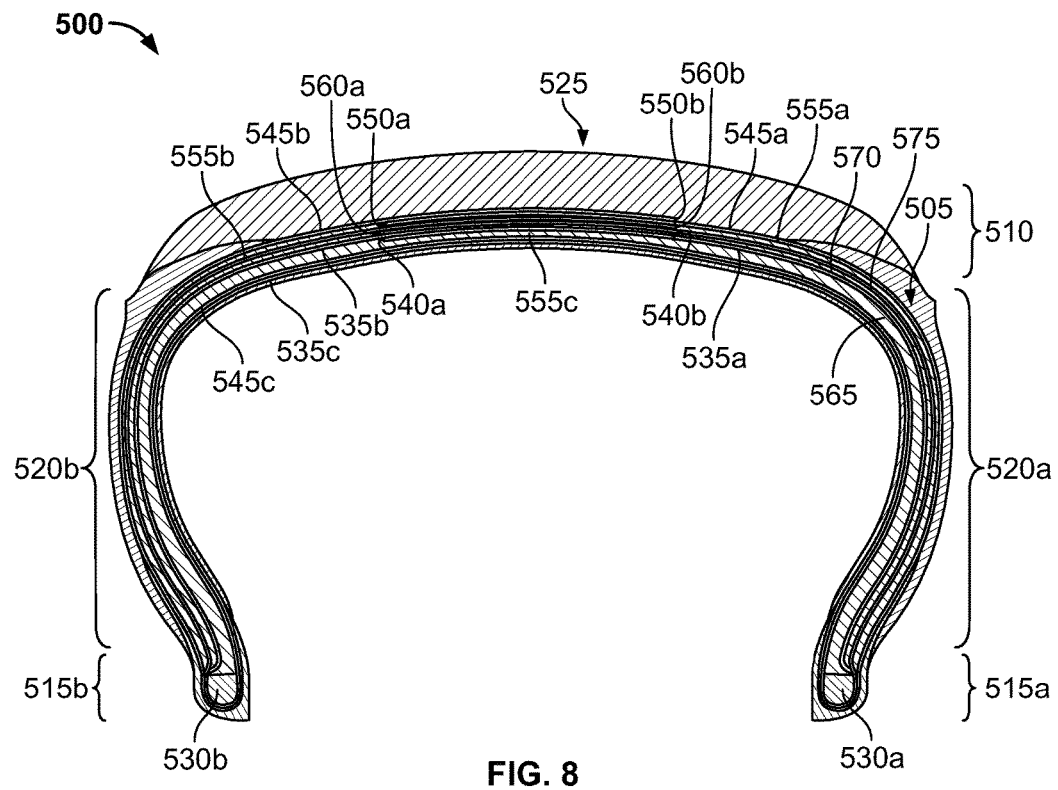
FIG. 8 is a cross-section of a tire having another alternative embodiment of a toroidal element incorporated therein.

FIG. 8 illustrates a cross-section of a tire 500 having an alternative embodiment of a toroidal element 505 incorporated therein. Tire 500 includes a crown region 510, a pair of bead regions 515, including a first bead region 515a and a second bead region 515b, and a pair of sidewall regions 520a,b extending from the crown region 510 to the bead regions 515. A tread 525 is formed in the crown region 510 of the tire. Each bead region 515 includes a bead 530 and may optionally include a bead filler (not shown), a gum abrasion strip (not shown), and other components therein.

Tire 500 further includes a first body ply 535 having a first turned-up portion 535a, a second turned up portion 535b, and a main portion 535c. The main portion 535c extends circumferentially about the tire from a first bead 530a to a second bead 530b. The first turned-up portion 535a extends around the first bead 530a and terminates at a first end 540a in the crown region 510 of the tire 500. The second turned-up portion 535b extends around the second bead 530b and terminates at a second end 540b in the crown region 510 of the tire 400, such that the first turned-up portion 535a overlaps the second turned-up portion 535b.

Tire 500 further includes a second body ply 545 having a first turned-up portion 545a, a second turned up portion 545b, and a main portion 545c. The main portion 545c extends circumferentially about the tire from the first bead 530a to the second bead 530b. The first turned-up portion 545a extends around the first bead 530a and terminates at a first end 550a in the crown region 510 of the tire 500. The second turned-up portion 545b extends around the second bead 530b and terminates at a second end 550b in the crown region 510 of the tire 500, such that the first turned-up portion 545a overlaps the second turned-up portion 545b.

Tire 500 also includes a third body ply 555 having a first turned-up portion 555a, a second turned up portion 555b, and a main portion 555c. The main portion 555c extends circumferentially about the tire from the first bead 530a to the second bead 530b. The first turned-up portion 555a extends around the first bead 530a and terminates at a first end 560a in the crown region 510 of the tire 500. The second turned-up portion 555b extends around the second bead 530b and terminates at a second end 560b in the crown region 510 of the tire 500, such that the first turned-up portion 555a overlaps the second turned-up portion 555b.

In the illustrated embodiment, the toroidal element 505 includes the body ply cords 535, 545, 555 as well as a first inner rubber component 565, a second inner rubber component 570, and a third inner rubber component 575. The first inner rubber component 565 is sandwiched between the main portions 535c, 545c, 555c of the first, second, and third body plies 535, 545, 555 and the turned up portions 535a,b of the first body ply 535. The second inner rubber component 570 is sandwiched between the turned up portions 535a,b of the first body ply 535 and the turned up portions 545a,b of the second body ply 545. The third inner rubber component 575 is sandwiched between the turned up portions 545a,b of the second body ply 545 and the turned up portions 555a,b of the third body ply 555. The toroidal element 505 therefore stretches from bead to bead, and includes the beads 530a,b.

Figure 9:
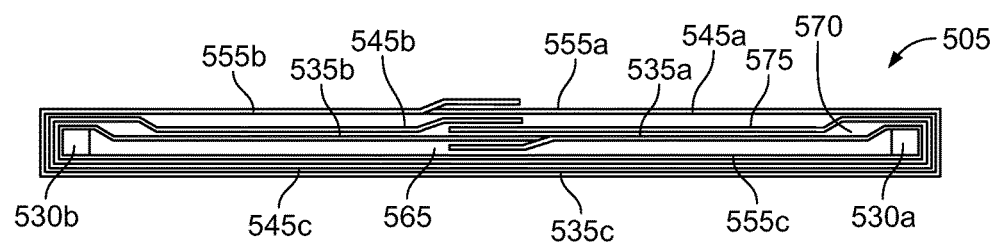
FIG. 9 is a schematic drawing of another alternative embodiment of a toroidal element shown in a straight condition for illustrative purposes.

FIG. 9 is a schematic drawing of one embodiment of the toroidal element 505 of FIG. 8 shown in a straight condition for illustrative purposes. The first inner rubber component 565 is sandwiched between the main portions 535c, 545c, 555c of the first, second, and third body plies 535, 545, 555 and the turned up portions 535a,b of the first body ply 535. The second inner rubber component 570 is sandwiched between the turned up portions 535a,b of the first body ply 535 and the turned up portions 545a,b of the second body ply 545. The third inner rubber component 575 is sandwiched between the turned up portions 545a,b of the second body ply 545 and the turned up portions 555a,b of the third body ply 555. The toroidal element 505 therefore stretches from bead to bead, and include the beads 530a,b. In building a tire, the first, second, and third rubber components 565, 570, 575 may initially be straight, as shown, and then bent to a toroidal shape. Alternatively, the first, second, and third rubber components 565, 570, 575 may be pre-formed in a toroidal shape. In an alternative embodiment (not shown), the toroidal element is a partial toroidal element that extends into one sidewall of the tire, but not both sidewalls.

While the illustrated embodiments generally show a rubber components 565, 570, 575 disposed between main portions 535c, 545c, 555c of body plies and turned-up portions 535a,b, 545a,c, and 555a,b of the body plies, it should be understood that any combination of rubber layers and body ply layers may be employed. The body ply layers may be formed of multiple body plies that form multiple main portions and multiple turned-up portions, or multiple main portions and multiple turned-down portions. The body ply layers may also be formed of separate body plies.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire having a crown region and a pair of sidewall regions, the tire comprising:
    a pair of beads, including a first bead and a second bead;
    a body ply having a main portion which extends circumferentially about the tire from the first bead to the second bead, a first turned-up portion around the first bead, and a second turned-up portion around the second bead,
        wherein the first turned-up portion has a first end in the crown region of the tire,
        wherein the second turned-up portion has a second end in the crown region of the tire, and
        wherein the first turned-up portion overlaps the second turned-up portion;
    a toroidal element,
        wherein the toroidal element includes an outer region formed by the body ply turned-up portions, an inner region formed by the body ply main portion, and a central region formed by an inner rubber component located between the main portion of the body ply and the turned-up portions of the body ply,
        wherein at least a portion of the central region has a greater elasticity than either the inner or outer regions,
        wherein the toroidal element extends across the crown region of the tire,
        wherein the toroidal element extends along at least a portion of at least one sidewall region of the tire,
        wherein the toroidal element extends from the first bead to the second bead,
        wherein the inner rubber component extends from the first bead to the second bead,
        wherein the inner rubber component has a mechanical modulus in a range of $9.7 \times 10^6$ Pa to $2.8 \times 10^7$ Pa at 15% strain, and
        wherein the inner rubber component has a loss modulus (tan δ) in a range of 0.03 to 0.20 measured at 100° C., 7% deflection and 10 Hz.

2. The tire of claim 1, wherein the central region of the toroidal element includes at least one high stiffness layer between a pair of lower stiffness layers.

3. The tire of claim 1, wherein the toroidal element has a thickness T and the inner and outer regions have a thickness $T_1$ and $T_2$, respectively, wherein T is at least three times greater than $T_1$, and wherein T is at least three times greater than $T_2$.

4. The tire of claim 3, wherein $T_1=T_2$.

5. The tire of claim 1, wherein the inner rubber component has a Shore A hardness between 70 and 97.

6. A tire comprising:
    a tread formed in a crown region of the tire;
    sidewall regions extending from the crown region to bead areas;
    a toroidal element extending across a crown region of the tire, and further extending along at least a portion of each sidewall region of the tire, the toroidal element having a central region located between inner and outer regions, wherein the central region is more elastic than the inner and outer regions; and
    wherein the central region of the toroidal element is constructed of a resin material selected from the group consisting of Polyphenylsulfate, Polyetherimide, and an epoxy adhesive.

7. The tire of claim 6, wherein the central region of the toroidal element includes a layer of rubber having a mechanical modulus in a range of $9.7 \times 10^6$ Pa to $2.8 \times 10^7$ Pa at 15% strain and a Shore A hardness in a range of 70 to 97.

8. The tire of claim 6, wherein the central region of the toroidal element includes a layer of rubber having a loss modulus (tan δ) in a range of 0.03 to 0.20 measured at 100° C., 7% deflection and 10 Hz.

9. The tire of claim 6, wherein the central region of the toroidal element is a plurality of layers of non-reinforced resin tape.

10. The tire of claim 6, wherein each of the inner and outer regions of the toroidal element is formed of a reinforced resin material.

11. The tire of claim 6, wherein the toroidal element extends from a first bead area to a second bead area.

12. The tire of claim 6, further comprising a body ply,
    wherein the body ply includes a main portion forming the inner region of the toroidal element, which extends circumferentially about the tire from a first bead area to a second bead area,
    wherein the body ply further includes a first turned-up portion and a second turned-up portion forming the outer region of the toroidal element,
    wherein the first turned-up portion has a first end in the crown region of the tire,
    wherein the second turned-up portion has a second end in the crown region of the tire, and
    wherein the first turned-up portion does not overlap the second turned-up portion, and at least one additional ply spans at least a portion of the crown region, partially overlapping the first and second turned-up ends.

13. The tire of claim 6, further comprising a body ply,
    wherein the body ply includes a main portion forming the inner region of the toroidal element, which extends circumferentially about the tire from a first bead area to a second bead area,
    wherein the body ply further includes a first turned-up portion and a second turned-up portion forming the outer region of the toroidal element, and
    wherein the first turned-up portion at least partially overlaps the second turned-up portion.

14. A tire having a crown region and a pair of sidewall regions, the tire comprising:
    a pair of beads, including a first bead and a second bead;
    a body ply having a main portion which extends circumferentially about the tire from the first bead to the second bead, a first turned-up portion around the first bead, and a second turned-up portion around the second bead,
        wherein the first turned-up portion has a first end in the crown region of the tire, wherein the second turned-up portion has a second end in the crown region of the tire, and wherein the first turned-up portion overlaps the second turned-up portion;

a toroidal element, wherein the toroidal element includes an outer region formed by the body ply turned-up portions, an inner region formed by the body ply main portion, and a central region formed by an inner rubber component located between the main portion of the body ply and the turned-up portions of the body ply, wherein at least a portion of the central region has a greater elasticity than either the inner or outer regions, wherein the toroidal element extends across the crown region of the tire, wherein the toroidal element extends along at least a portion of at least one sidewall region of the tire, and wherein the central region of the toroidal element includes at least one high stiffness layer between a pair of lower stiffness layers.

15. The tire of claim 14, wherein the toroidal element has a thickness T and the inner and outer regions have a thickness $T_1$ and $T_2$, respectively, wherein T is at least three times greater than $T_1$, and wherein T is at least three times greater than $T_2$.

16. The tire of claim 15, wherein $T_1=T_2$.

17. The tire of claim 14, wherein the toroidal element extends from the first bead to the second bead.

18. The tire of claim 14, wherein the inner rubber component has a mechanical modulus in a range of $9.7 \times 10^6$ Pa to $2.8 \times 10^7$ Pa at 15% strain.

19. The tire of claim 14, wherein the inner rubber component has a Shore A hardness in a range of 70 to 97.

20. The tire of claim 14, wherein the inner rubber component has a loss modulus (tan δ) in a range of 0.03 to 0.20 measured at 100° C., 7% deflection and 10 Hz.

* * * * *